R. W. GRISWOLD.
HANDLE.
APPLICATION FILED MAR. 17, 1922.

1,422,355.

Patented July 11, 1922.

Roger W. Griswold INVENTOR

BY

ATTORNEY.

UNITED STATES PATENT OFFICE.

ROGER W. GRISWOLD, OF ERIE, PENNSYLVANIA, ASSIGNOR TO THE GRISWOLD MANUFACTURING COMPANY, OF ERIE, PENNSYLVANIA, A CORPORATION OF PENNSYLVANIA.

HANDLE.

1,422,355.      Specification of Letters Patent.      Patented July 11, 1922.

Application filed March 17, 1922. Serial No. 544,584.

*To all whom it may concern:*

Be it known that I, ROGER W. GRISWOLD, a citizen of the United States, residing at Erie, in the county of Erie and State of Pennsylvania, have invented new and useful Improvements in Handles, of which the following is a specification.

This invention is designed to improve coil wire handles used on cooking utensils or similar articles.

The invention is illustrated in the accompanying drawings as follows:—

Figure 1:
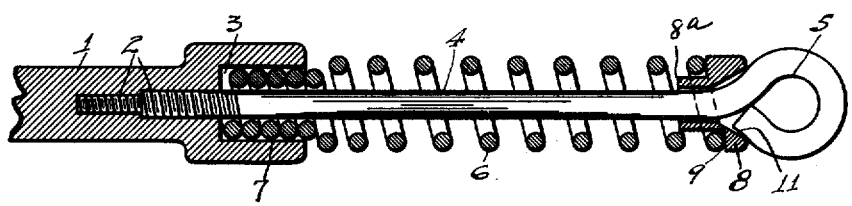

Fig. 1 shows a central section through the handle.

Figure 2:
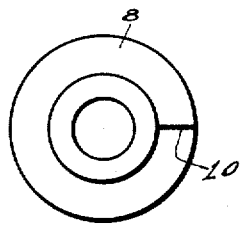

Fig. 2 an end view of a seating device.

Figure 3:
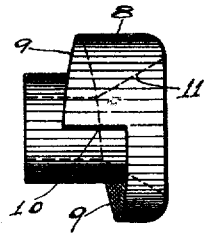

Fig. 3 a side elevation of the same.

Figure 4:
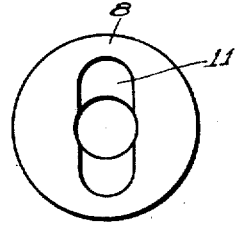

Fig. 4 an end view from the side opposite that shown in Fig. 2.

1 marks a shank which for example may be of a waffle iron with which the handle is commonly used. 2 a screw-threaded opening in the shank, 3 a socket from which the screw-threaded opening leads, and 4 an eye bolt extending through the socket and screwed into the shank, the eye bolt having an eye 5 at its outer end, this eye being spaced from the shank. A handle 6 is formed of coiled wire and is arranged around the eye bolt 4. The inner end of the coil is of reduced diameter and extends into a socket 7 forming a bearing therein. A seat 8 is provided for the outer end of the coil, this seat having a spiral seating surface 9 conforming to the surface of the last coil of the handle and having an end 10 abutting the end of the coil. The outer face of the seat is provided with a socket 11 in which the inner end of the eye bolt is seated, thus locking the seat with the eye bolt and finishing the end of the handle.

The screw is a tight-fitting one and of some length so that when the eye bolt is set up to place the eye bolt is locked against turning through the ordinary strains to which the implement is subjected and the eye bolt screws up a sufficient distance to place the handle under tension. The inner end, therefore, is secured by the socket and the outer end is locked by the seat against turning and the coil as a whole is held taut so that the implement to which the handle is attached may be readily turned by turning this handle.

It will be noted that the seat 8 has a projection 8ª which assures the alinement of the seat with the eye bolt and thus holds the coil in proper alinement.

What I claim as new is:—

1. In a handle, the combination of a shank; an eye bolt screwed into the shank; a handle of coiled wire arranged around the eye bolt; and a seat for the outer end of the coil having a spiral surface conforming to the last coil of the wire with a shoulder abutting the end of the coil, the outer face of the seat having a socket locking with the eye, the eye bolt being screwed into the shank to place and hold the coil under tension, the seat locking the coil against turning on the bolt.

2. In a handle, the combination of a shank having a socket; a bolt extending through the socket and screwed into the shank; and a handle of wire coiled around the bolt, the inner end of the coil extending into the socket and secured therein by the bolt.

3. In a handle, the combination of a shank having a socket; a bolt extending through the socket and screwed into the shank; and a handle of wire coiled around the bolt, the inner end of the wire being of less diameter than the outer portion thereof and extending into the socket in the shank.

4. In a handle, the combination of a shank having a socket in the end thereof; an eye bolt extending through the socket and screwed into the shank; a handle of coil wire having a reduced diameter at its inner end, the reduced portion extending into the socket; and a seat engaging the outer end of the coil, said seat having a spiral surface conforming to the last coil of the wire with a shoulder engaging the end of the wire and the outer face of the seat having a socket receiving the eye of the eye bolt and locking the seat with the eye bolt, said eye bolt being screwed into the shank to place the handle under tension and to lock the handle through the seat against turning on the eye bolt.

5. In a handle, the combination of a shank; an eye bolt screwed into the shank; a handle of coiled wire arranged around the eye bolt; and a seat for the outer end of the coil having a spiral surface conforming to the last coil of the wire, the outer face of the seat having an inwardly extending projection on the eye bolt alining the seat with the eye bolt.

6. In a handle, the combination of a shank; an eye bolt screwed into the shank; a handle of coiled wire arranged around the eye bolt; and a seat for the outer end of the coil having a spiral surface conforming to the last coil of the wire, the outer face of the seat having a socket locking with the eye and having an inwardly extending projection on the eye bolt alining the seat with the eye bolt.

In testimony whereof I have hereunto set my hand.

ROGER W. GRISWOLD.